(12) United States Patent
Musayev et al.

(10) Patent No.: US 7,860,996 B2
(45) Date of Patent: Dec. 28, 2010

(54) MEDIA STREAMING WITH SEAMLESS AD INSERTION

(75) Inventors: Eldar Musayev, Sammamish, WA (US); Gurpratap Virdi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 12/188,085

(22) Filed: Aug. 7, 2008

(65) Prior Publication Data

US 2009/0300145 A1    Dec. 3, 2009

Related U.S. Application Data

(60) Provisional application No. 61/057,755, filed on May 30, 2008, provisional application No. 61/057,759, filed on May 30, 2008.

(51) Int. Cl.
*G06F 15/16* (2006.01)
*H04N 7/10* (2006.01)

(52) U.S. Cl. .............................. 709/231; 725/32; 725/36

(58) Field of Classification Search ................. 709/219, 709/231, 232; 725/32, 36
See application file for complete search history.

(56) References Cited

U.S. PATENT DOCUMENTS

| | | | |
|---|---|---|---|
| 7,107,606 B2 | 9/2006 | Lee | |
| 7,174,384 B2 | 2/2007 | Cheung | |
| 7,206,854 B2* | 4/2007 | Kauffman et al. | ........... 709/231 |
| 7,313,755 B2 | 12/2007 | Rahman et al. | |
| 7,346,007 B2 | 3/2008 | Curcio et al. | |
| 7,359,955 B2 | 4/2008 | Menon et al. | |
| 7,360,230 B1 | 4/2008 | Paz et al. | |
| 7,365,752 B2 | 4/2008 | Xie | |
| 7,409,145 B2 | 8/2008 | Antoun et al. | |
| 7,424,730 B2 | 9/2008 | Chou | |
| 7,444,419 B2 | 10/2008 | Green | |
| 7,493,644 B1 | 2/2009 | Tanskanen | |
| 7,565,429 B1* | 7/2009 | Fernandez | ................... 709/224 |
| 2002/0073084 A1* | 6/2002 | Kauffman et al. | ............. 707/10 |
| 2002/0095332 A1* | 7/2002 | Doherty et al. | ................ 705/14 |
| 2003/0055995 A1 | 3/2003 | Ala-Honkola | |
| 2003/0061607 A1* | 3/2003 | Hunter et al. | .................. 725/32 |
| 2003/0093530 A1 | 5/2003 | Syed | |
| 2004/0117427 A1 | 6/2004 | Allen et al. | |
| 2004/0131340 A1 | 7/2004 | Antoun et al. | |
| 2004/0268397 A1 | 12/2004 | Dunbar et al. | |
| 2005/0066063 A1 | 3/2005 | Grigorovitch et al. | |
| 2005/0207734 A1 | 9/2005 | Howell | |

(Continued)

OTHER PUBLICATIONS

Agarwal et al., "Optimal Buffering Policy for Downloading Music in Heterogeneous Wireless Networks," Wireless Communications and Networking Conference, vol. 1, pp. 337-341, Mar. 17-21, 2002.

(Continued)

*Primary Examiner*—Krisna Lim
(74) *Attorney, Agent, or Firm*—Klarquist Sparkman, LLP

(57) ABSTRACT

The present disclosure relates to playback of video/audio streaming media data with seamless advertisement insertion. A content player monitors playback of the media stream and determines a location to insert an advertisement. The content player pauses downloads of the media stream and begins downloading the advertisement while the media stream continues to be rendered. The advertisement is, consequently, loaded prior to a start time and allows for an instantaneous rendering at an advertisement insertion point in the media stream.

16 Claims, 13 Drawing Sheets

U.S. PATENT DOCUMENTS

| | | | |
|---|---|---|---|
| 2006/0015637 A1 | 1/2006 | Chung | |
| 2006/0026294 A1 | 2/2006 | Virdi | |
| 2006/0088094 A1 | 4/2006 | Cieplinski et al. | |
| 2006/0126713 A1 | 6/2006 | Chou et al. | |
| 2006/0165166 A1 | 7/2006 | Chou et al. | |
| 2006/0184697 A1 | 8/2006 | Virdi | |
| 2006/0248570 A1 | 11/2006 | Witwer | |
| 2006/0282566 A1 | 12/2006 | Virdi et al. | |
| 2007/0006064 A1 | 1/2007 | Colle | |
| 2007/0058926 A1 | 3/2007 | Virdi | |
| 2007/0083886 A1* | 4/2007 | Kauffman et al. | 725/34 |
| 2007/0097816 A1 | 5/2007 | Van Gassel | |
| 2007/0192789 A1* | 8/2007 | Medford | 725/31 |
| 2007/0204321 A1* | 8/2007 | Shen et al. | 725/135 |
| 2008/0022005 A1 | 1/2008 | Wu et al. | |
| 2008/0037954 A1 | 2/2008 | Lee | |
| 2008/0046939 A1 | 2/2008 | Lu et al. | |
| 2008/0086570 A1* | 4/2008 | Dey et al. | 709/231 |
| 2008/0172441 A1 | 7/2008 | Speicher | |
| 2008/0195744 A1 | 8/2008 | Bowra | |
| 2008/0195761 A1 | 8/2008 | Jabri et al. | |
| 2008/0201386 A1 | 8/2008 | Maharajh et al. | |
| 2008/0256085 A1* | 10/2008 | Lee et al. | 707/10 |
| 2009/0007171 A1* | 1/2009 | Casey et al. | 725/34 |
| 2009/0043657 A1* | 2/2009 | Swift et al. | 705/14 |
| 2009/0076904 A1* | 3/2009 | Serena | 705/14 |
| 2009/0132356 A1* | 5/2009 | Booth et al. | 705/14 |
| 2009/0199236 A1* | 8/2009 | Barrett et al. | 725/36 |
| 2009/0297123 A1 | 12/2009 | Virdi et al. | |
| 2009/0300203 A1 | 12/2009 | Virdi et al. | |
| 2009/0300204 A1 | 12/2009 | Zhang et al. | |
| 2010/0153988 A1* | 6/2010 | Takai et al. | 725/32 |

OTHER PUBLICATIONS

Chavez et al., "Monitoring-Based Adaptive Overlay Streaming Media," printed from http://www.eecs.berkeley.edu/Programs/ugrad/superb/papers2003/Brian%20Chavez.pdf on Aug. 12, 2008.

Huang et al., "Adaptive Live Video Streaming by Priority Drop," Proceedings of the IEEE Conference on Advanced Video and Signal Based Surveillance, pp. 342-347, Jul. 21-22, 2003.

Qazzaz et al., "Providing Interactive Video on Demand Services in Distributed Architecture," 29$^{th}$ Proceedings of the Euromicro Conference, pp. 215-222, Sep. 1-6, 2003.

Reibman et al., "Video Quality Estimation for Internet Streaming," International World Wide Web Conference, pp. 1168-1169, 2005.

Srinivasan et al., "Windows Media Video 9: Overview and Applications," Signal Processing: Image Communication, vol. 19, pp. 851-875, Oct. 2004.

Zhang et al., "Seamless Bit-Stream Switching in Multirate-Based Video Streaming Systems," EURASIP Journal on Applied Signal Processing, vol. 2006, No. 18, p. 1-11, 2006.

Chang et al., "BubbleUp: Low Latency Fast-Scan for Media Servers," Fifth ACM International Conference on Multimedia 1997, Nov. 1997, 12 pages.

Guo et al., "P2Cast: Peer-to-peer Patching Scheme for VoD Service," Proceedings of the 12th International Conference on World Wide Web, 2003, 9 pages.

Microsoft TechNet, "Streaming Media Services Role," Jan. 2008, 3 pages.

Zheng et al., "Multimedia Over High Speed Networks: Reducing Network Requirements with Fast Buffer Fillup," IEEE GLOBECOM-98, Nov. 1998, 6 pages.

* cited by examiner ered. The content player pauses downloads of the media stream and begins downloading the advertisement while the media stream continues to be rendered. The advertisement is, consequently, loaded prior to a start time and allows for an instantaneous rendering at an advertisement insertion point in the media stream.

MEDIA STREAMING WITH SEAMLESS AD INSERTION

CROSS-REFERENCE TO RELATED APPLICATIONS

This application claims the benefit of U.S. Provisional Patent Application No. 61/057,759, filed on May 30, 2008, and U.S. Provisional Patent Application No. 61/057,755, filed May 30, 2008. Both applications are hereby incorporated in their entirety.

BACKGROUND

With the increasing popularity of playing streaming audio and video over networks such as the Internet, there is a need for optimizing the data transferred from a server to a client such that the client's experience is maximized even if network conditions during playback are inconsistent. Optimizing the client's experience involves making encoding decisions such that the video can be transferred and reconstructed with a minimal number of errors.

The term "streaming" is typically used to indicate that the data representing the media is provided by a host computer over a network to a playback device (i.e., a media playback computer implemented as any of a variety of conventional computing devices, such as a desktop PC, a notebook or portable computer a cellular telephone or other wireless communication device, a personal digital assistant (PDA), a gaming console, etc.) The client computer typically renders the streaming content as it is received from the host, rather than waiting for the entire file to be delivered.

The quality level is generally dictated by the bit rate specified for the encoded audio or video portions of the input stream. A higher bit rate generally indicates that a larger amount of information about the original audio or video is encoded and retained, and therefore a more accurate reproduction of the original input audio or video can be presented during video playback. Conversely, a lower bit rate indicates that less information about the original input audio or video is encoded and retained, and thus a less accurate reproduction of the original audio or video will be presented during video playback.

Generally, the bit rate is specified for encoding each of the audio and video based on several factors. The first factor is the network condition between the server and the client. A network connection that can transfer a high amount of data indicates that a higher bit rate can be specified for the input video that is subsequently transferred over the network connection. The second factor is the desired start-up latency. Start-up latency is the delay that a video playback tool experiences when first starting up due to the large amount of data that has to be received, processed, and buffered. Start-up latency can also occur after a seek operation, where the user selects variable positions in the streaming content to view. A third factor is the processing capabilities of the playback device. The fourth factor is the tolerance to glitching. Glitching occurs when the content is not displayed at the rate it was authored causing the playback device to run out of data to display. In most cases any amount of start-up latency or glitching is intolerable, and it is therefore desirable to optimize the bit rate specified such that the start-up latency and the glitching are minimized or eliminated.

Whatever bit rate is used, advertisements are generally not included into the media stream. Rather, the advertisements are inserted later, often targeted to particular people or regions. One common technique is to use multiple controls that compete for network bandwidth, which could delay the advertisement start-up and/or affect the quality of the advertisement rendered.

SUMMARY

The present disclosure relates to playback of video/audio streaming media data with seamless advertisement insertion. A content player monitors playback of the media stream and determines a location to insert an advertisement. The content player pauses downloads of the media stream and begins downloading the advertisement while the media stream continues to be rendered. The advertisement is, consequently, loaded prior to a start time and allows for an instantaneous rendering at an advertisement insertion point in the media stream.

The foregoing and other objects, features, and advantages of the invention will become more apparent from the following detailed description, which proceeds with reference to the accompanying figures.

DETAILED DESCRIPTION

As used in this application and in the claims, the singular forms "a," "an" and "the" include the plural forms unless the context clearly dictates otherwise. Additionally, the term "includes" means "comprises." Although the operations of some of the disclosed methods and apparatus are described in a particular, sequential order for convenient presentation, it should be understood that this manner of description encompasses rearrangement, unless a particular ordering is required by specific language set forth below. For example, operations described sequentially can in some cases be rearranged or performed concurrently.

Any of the methods described herein can be performed (at least in part) using software comprising computer-executable instructions stored on one or more computer-readable media. Furthermore, any intermediate or final results of the disclosed methods can be stored on one or more computer-readable media. It should be understood that the disclosed technology is not limited to any specific computer language, program, or computer. For instance, a wide variety of commercially available computer languages, programs, and computers can be used.

Figure 1:
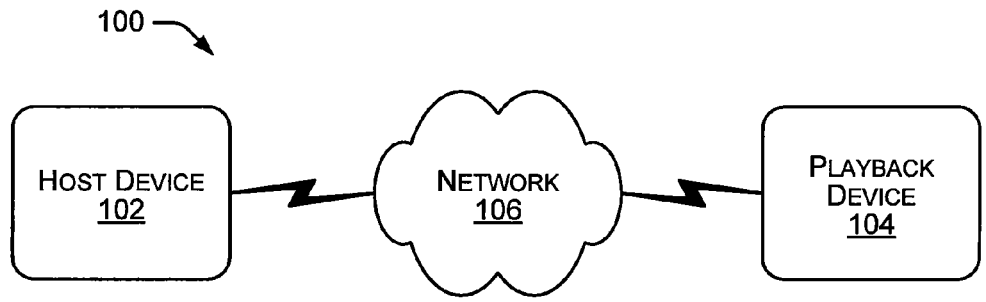
FIG. 1 illustrates an exemplary environment suitable for sending streaming media content over a network from a host device to a playback device.

FIG. 1 illustrates an exemplary environment 100 which can be suitable for transmitting media content being streamed over a network 106 from a host computer device 102 to a playback computer device 104. The network 106 can be any of a variety of conventional network topologies and types (including optical, wired and/or wireless networks), using a variety of conventional network protocols (including public and/or proprietary protocols). The network 106 can include, for example, a home network, a corporate network, or the Internet, as well as possibly at least portions of one or more local area networks (LANs) and/or wide area networks (WANs) or telephone networks.

A host device 102 generally stores media content and streams media content to the playback device 104. The playback device 104 can receive streaming media content via the network 106 from host device 102 and plays it for a user. Additionally, the playback device 102 can request a desired bit rate from the host device, which offers multiple bit rates to download. Host device 102 may be implemented as any of a variety of conventional computing devices, including, for example, a desktop PC, a notebook or portable computer, a workstation, an Internet appliance, and combinations thereof. Playback device 104 may also be implemented as any of a variety of conventional computing devices, including, for example, a desktop PC, a notebook or portable computer, a workstation, an Internet appliance, a gaming console, a handheld PC, a cellular telephone or other wireless communications device, a personal digital assistant (PDA), a set-top box, and combinations thereof.

Host device 102 can make any of a variety of data available for streaming to playback device 104, including content, such as audio, video, text, images, animation, and the like. However, as used herein with respect to the exemplary embodiments described below, media content is intended to represent audio/video (A/V) content or just video content. Furthermore, references made herein to "media content", "streaming media", "streaming video", "video content", and any variation thereof are generally intended to include audio/video content. The term "streaming" is used to indicate that the data representing the media content is provided over a network 106 to a playback device 104 and that playback of the content can begin prior to the content being delivered in its entirety.

Figure 2:
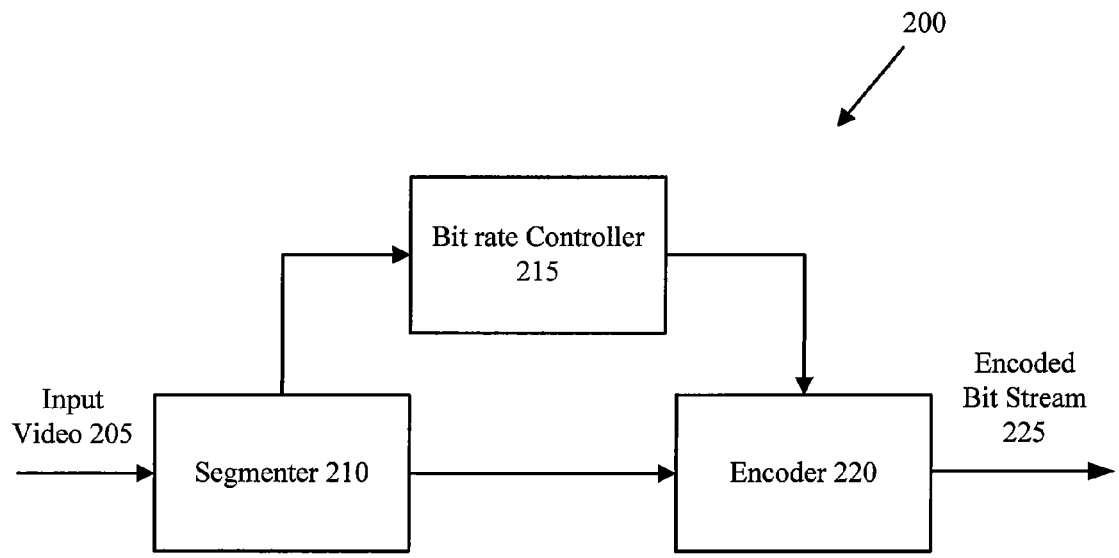
FIG. 2 illustrates an example encoder on the host device.

FIG. 2 illustrates an exemplary encoding tool 200 that can be implemented on the host device 102. The tool includes a segmenter 210 that accepts input video 205 and splits the input video into a plurality of segments each comprising a certain number of frames. Input video generally refers to a stream comprising both audio components and video components. In certain embodiments, the segments each comprise 60 frames. In other embodiments the segments can vary across a range of values such as comprising between 30 frames to 90 frames. The number of frames in the segment can be based on factors such as scene changes in the input video 205. For example, if a segment contains a scene change, the frames before the scene change could be drastically different than the frames after the scene change.

The segmenter 210 outputs the segments to a bit rate controller 215. The bit rate controller 215 analyzes each segment and selects bit rates for one or more bit rate layers for each of the segments. A bit rate layer is a layer comprising a specific bit rate used to encode the input video 205. The number of bit rate layers and their respective bit rates for each segment may be affected by factors associated with the segment such as the number of frames in the segment or the complexity of the input video 205 in the given segment. Additionally, the number of bit rate layers and their corresponding bit rates may be affected by factors not associated with the given segment such as limits on the size of the file or the maximum or minimum bandwidth of the network that the encoded input video 205 will be transferred through. In one embodiment, the bit rate controller 215 selects the bit rates for the bit rate layers for each of the segments independently from each of the other segments. Thus, a given segment may be encoded at the same or different bit rates as any other segment.

The segmenter 210 also outputs the segments to an encoder 220, and the bit rate controller 215 signals the bit rate layers for each segment to the encoder 220. The encoder 220 can encode according to a Windows Media Video or VC-1 format, MPEG-x format (e.g., MPEG-1, MPEG-2, or MPEG-4), H.26x format (e.g., H.261, H.262, H.263, or H.264), or other format. The encoder 220 may also be able to encode according to one or more audio standards such as WAV, FLAC, MP3, WMA, or some other standard. In some embodiments the encoder 220 encodes each segment as each bit rate layer and outputs a series of chunks in an encoded bit stream 225. Generally speaking, a chunk is a segment encoded as a particular bit rate layer. Thus, the encoder 220 can produce one or more chunks for each segment. In other embodiments, the encoder may encode the segment with less than all of the available bit rate layers. This may occur if, for example, a user defines a certain amount of time available for encoding, or conditions make certain bit rate layers un-necessary or undesirable.

As is well-understood in the art, the embodiment of FIG. 2 can be modified to encode a continuous media stream that is not divided into chunks. It is, however, desirable to be able to extract portions of the continuous media stream and to be able to logically define different portions of the media stream for extraction, if desired.

In certain embodiments, the encoding tool 200 may include a splitter (not shown) that splits the input video 205 into a separate video component and an audio component. In these embodiments, a separate segmenter, bit rate controller and encoder can be used to encode each of the video component and the audio component. The encoder for the video component can encode according to WMV or VC-1 format, MPEG-x format, H.26x format, or some other format. The encoder for the audio component can encode according to WAV, FLAC, MP3, WMA, or some other standard. Additionally, the segments for the video component and the segments for the audio component may be selected independently of each other. In this embodiment the segments of the video component may, but do not have to, comprise the same frames as the segments of the audio component.

Figure 3:
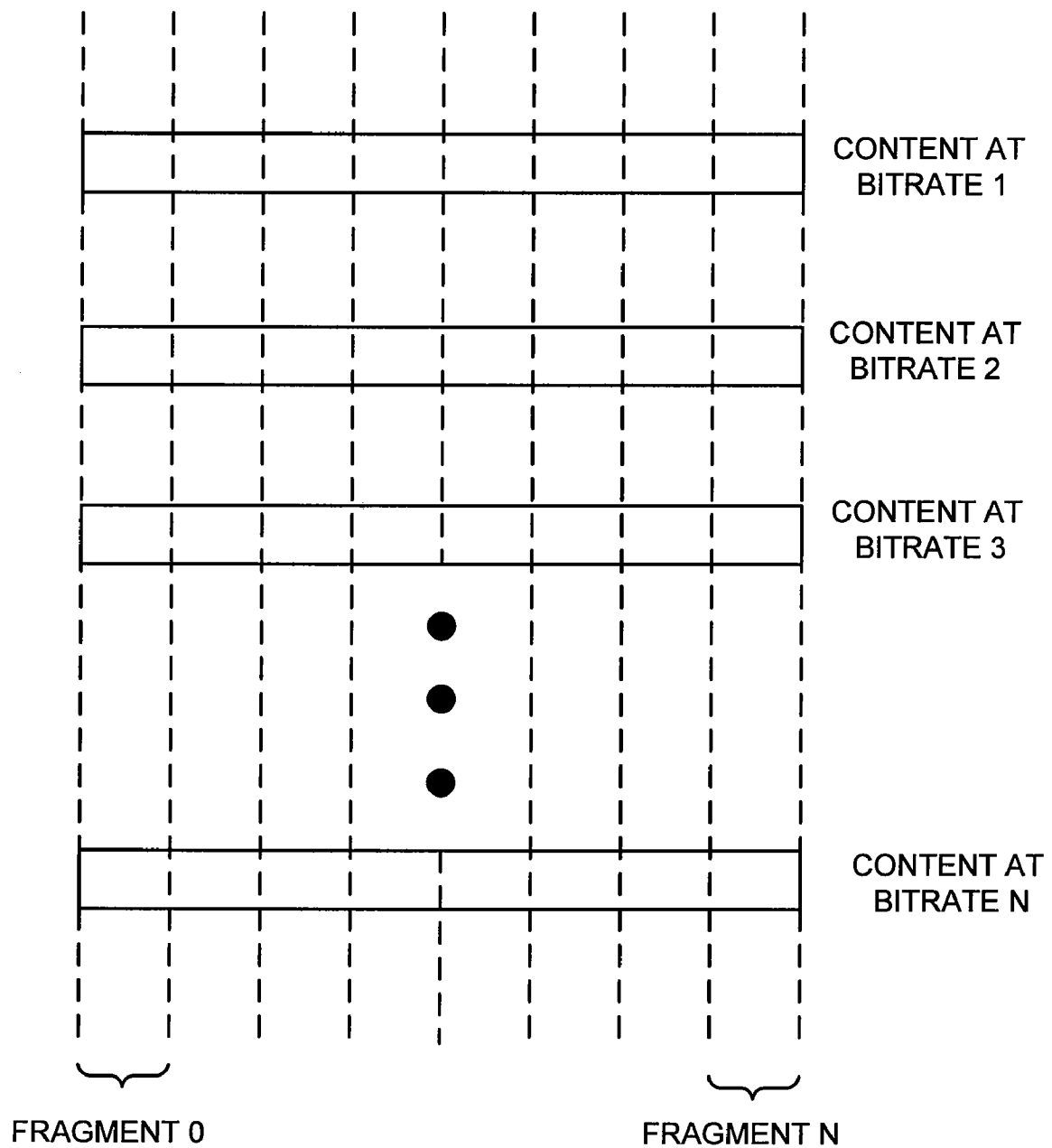
FIG. 3 illustrates an example media stream having multiple, fixed bit rates.

FIG. 3 shows multiple bit rates 1-N for particular content generated by the encoding tool of FIG. 2. The content is identical at each bit rate, but the quality increases with higher bit rates. In the illustrated example, there are N bit rates shown, where N could be any number. In particular embodiments, N is equal to 4. Additionally, the media streams can be divided into segments (also called fragments or chunks). The fragments may range from two to five seconds each in certain embodiments, although any duration may be used. A particular example includes video segments that are 2 seconds in length and audio segments are 5 seconds in length. In the example of FIG. 3, the bit rates are encoded at substantially constant rates (e.g., 1 kbps, 2 kbps, etc.).

Figure 4:
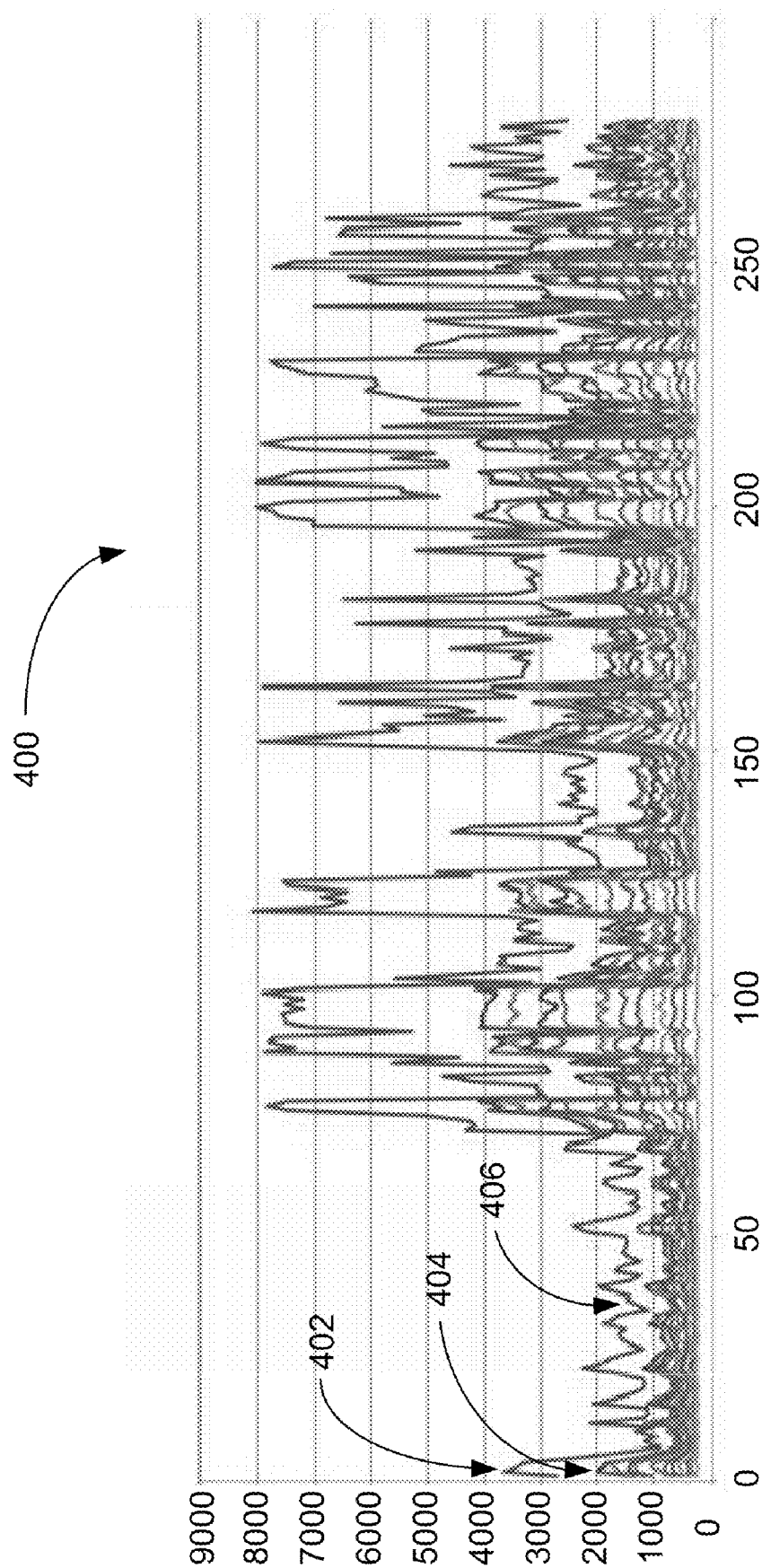
FIG. 4 illustrates an example media stream having multiple, variable bit rates.

FIG. 4 is an example of media streams encoded at variable bit rates 400 that may also be used with any of the embodiments described herein and that is generated by the encoding tool. Variable bit rates allocate a different amount of data to a scene based on complexity. Some scenes require a lower bit rate, such as dark scenes with low levels of movement. Other scenes, such as action scenes, require a higher bit rate because the scenes are more complex. A lower complexity scene can be seen between 0 and 50 seconds and has a small bit rate distribution between the media streams. The higher complexity scenes have a high amount of bit rate distribution as seen at about 100 seconds. In a case with such variance in the bit rates, although the bit rate of one media stream may, on average, be the highest, that media stream's bit rate may fall below the maximum bit rate for other media streams. For purposes of illustration, the bit rates are classified as index 1, 2, 3, . . . N. The bit rates for index 1 and 2 are shown at 402, 404, respectively. At a time shown at 406, the bit rate for index 1 is about 1050 bps. However, as can be seen at a time shown at 404, index 2 is about 2000 bps, which is a higher bit rate than index 1 at time 406. Thus, although index 1 is always higher than index 2 at any particular point of time, over the entire time period, index 2 can peak above values of index 1.

Figure 5:
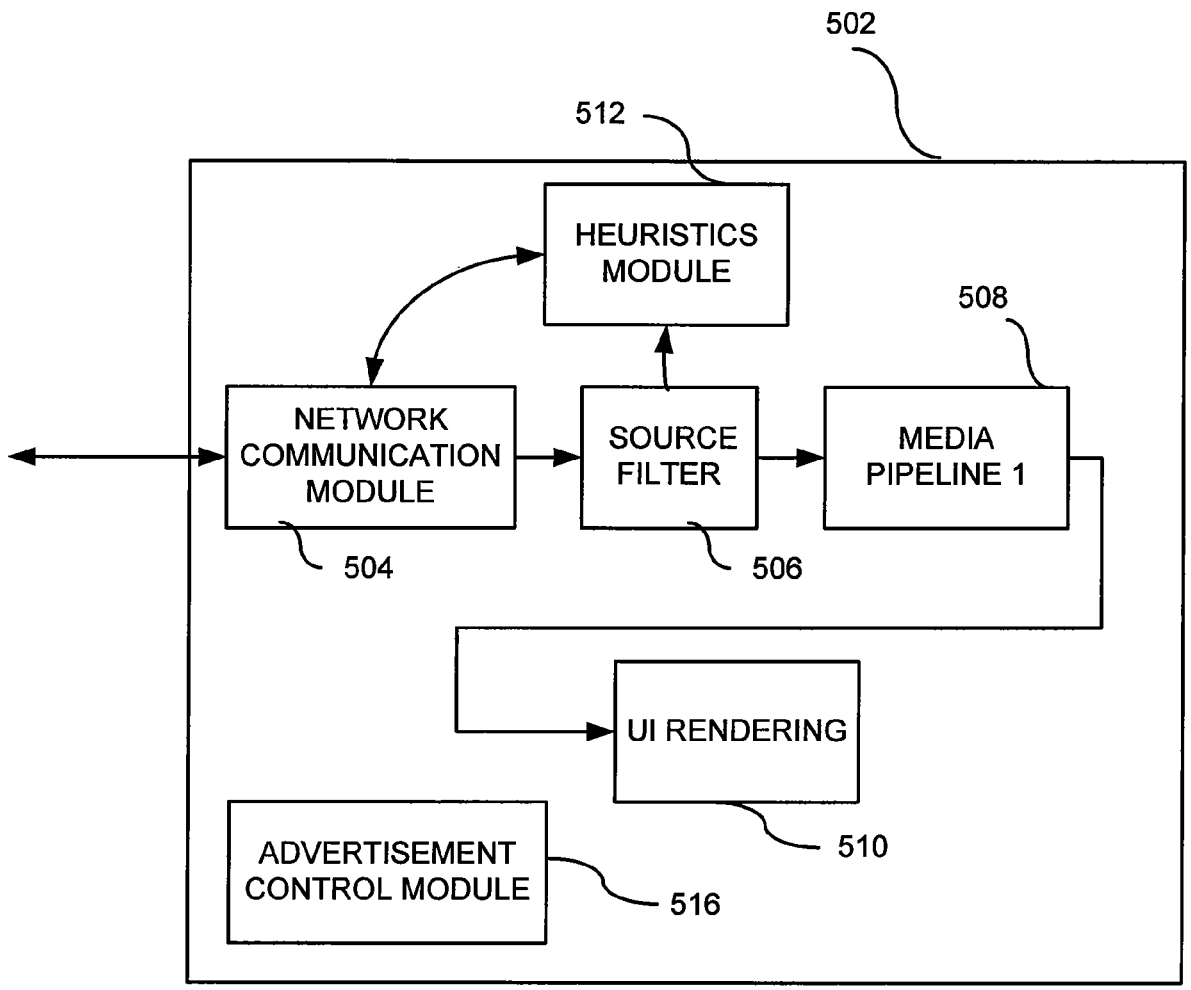
FIG. 5 illustrates an example application for rendering streaming media content on the playback device wherein a heuristics module is in the same application as a media pipeline.
Figure 8:
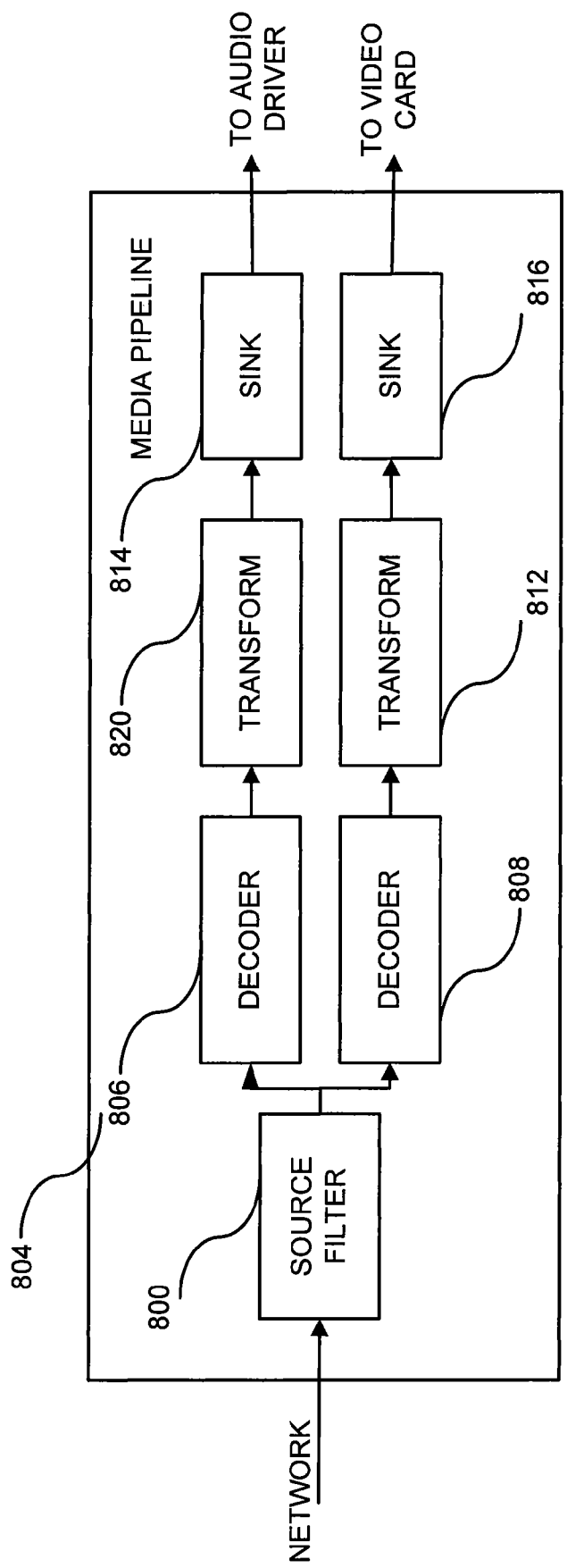
FIG. 8 illustrates an exemplary media pipeline on the playback device.
Figure 14:
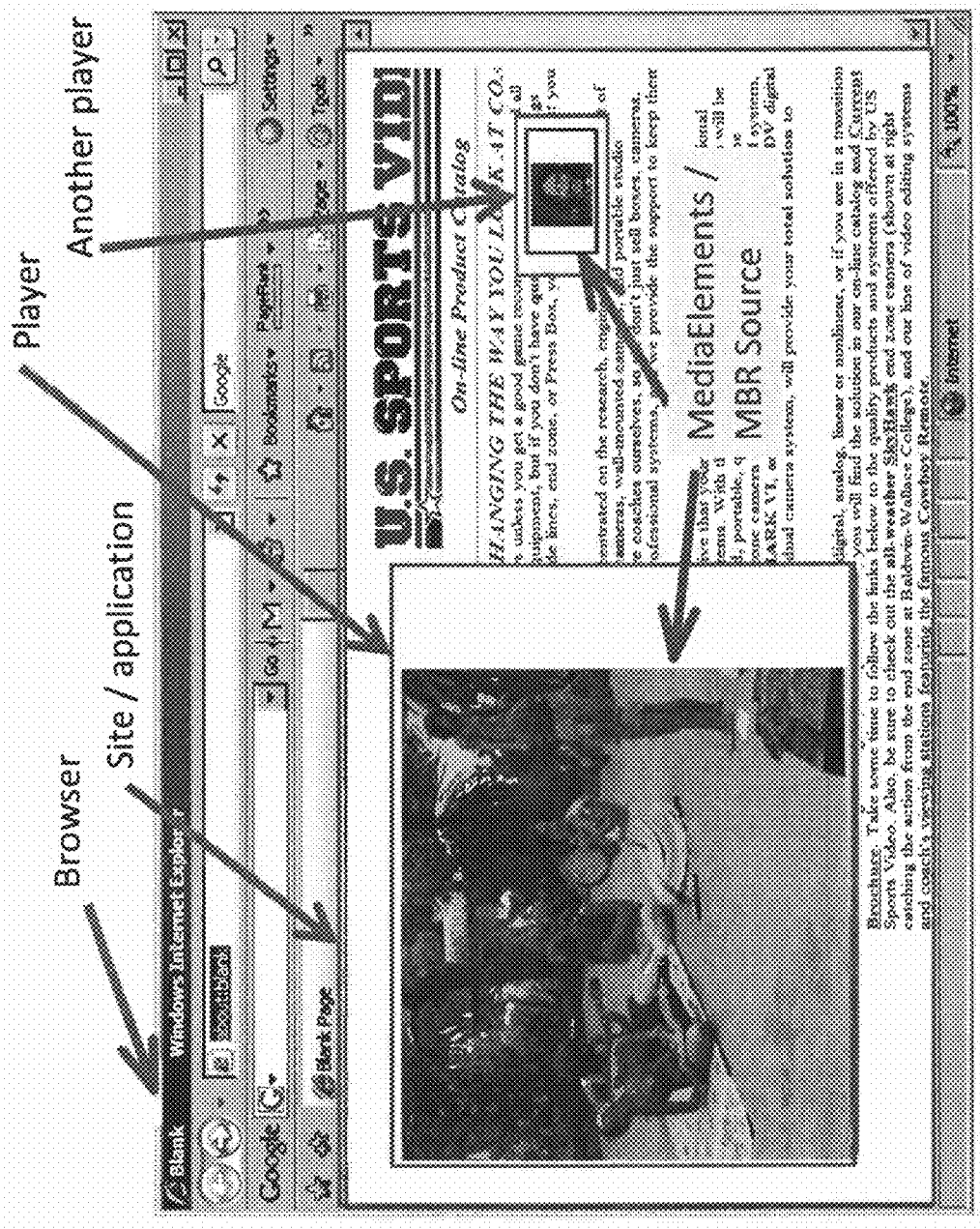
FIG. 14 is an example screen shot illustrating elements that can be used when rendering the seamless advertisement insertion.

FIG. 5 illustrates an application 502 loaded on a playback device for rendering content. The application 502 may be run on any desired playback device that renders a media stream, such as a gaming console, a cellular phone, a personal digital assistant, in a browser on a computer, etc. The application can include a network communication module 504, a source filter 506, a media pipeline 508, a UI rendering module 510, and a heuristics module 512. The network communication module 504 generally includes software to communicate with a network server from which the media content is streamed. Thus, it is a downloader to obtain the media stream from the network. One example network communication module includes software for implementing a hypertext transfer protocol when communicating with a Web server. Other well-known protocols can be used depending on the playback device. The network communications module chooses an appropriate bit rate of a media stream as directed by the heuristics module. The source filter 506 can be coupled to the network communication module in order to receive audio and video content from the network. The source filter extracts the core media data (by parsing the file, if necessary) and splits the audio and video into two streams for use by the media pipeline. An example media pipeline 508 is shown in FIG. 8 and is described more fully below. The source filter 506 can be included in the media pipeline or separated there from. In any event, the media pipeline decodes the audio and video streams and provides the decoded streams to the UI rendering module 510 for display. Alternatively, the media pipeline 508 can be coupled to a storage device (not shown) that persistently stores the uncompressed data stream. Any variety of media pipelines may be used. The heuristics module 512 monitors the network (via the network communication module 504) and the media pipeline 508 to make intelligent decisions about which bit rate to request from the server in order to minimize glitches that are rendered on the playback device. The application 502 can include an advertisement control module 516. The advertisement control module sits on top of the media pipeline and controls the behaviors of pausing playback through the media pipeline, loading and creating another media pipeline for the advertisements, resuming content display from the previous point in time, downloading data and feeding it to the media pipeline, etc. The application 502 can be a browser, a traditional application, or a player within an application. A specific example of one embodiment is shown in FIG. 14. The advertisement control module can monitor playback of the content being rendered and can switch to downloading an advertisement at the appropriate time. Alternatively, another source can monitor for a transition point and transfer control to the advertisement control module. Thus, the same source that is playing the main content can perform the monitoring or another source. The content is sufficiently buffered to allow it to continue to be rendered while the advertisement is being downloaded. Thus, there are not separate controls fighting for network bandwidth. Rather, the content player knows in advance of when an advertisement is expected to be displayed in the media segment (an advertisement insertion point). The content player can cease downloading the media segment in advance of the advertisement insertion point and start downloading the advertisement ahead of when the advertisement needs to be displayed. In particular embodiments, described further below, a media source can cease the downloading of the media segment and notify the content player to start downloading the advertisement ahead of when the advertisement needs to be displayed. Once the advertisement has been loaded, the content player can resume operation by downloading the media segment from the last point buffered.

Figure 6:
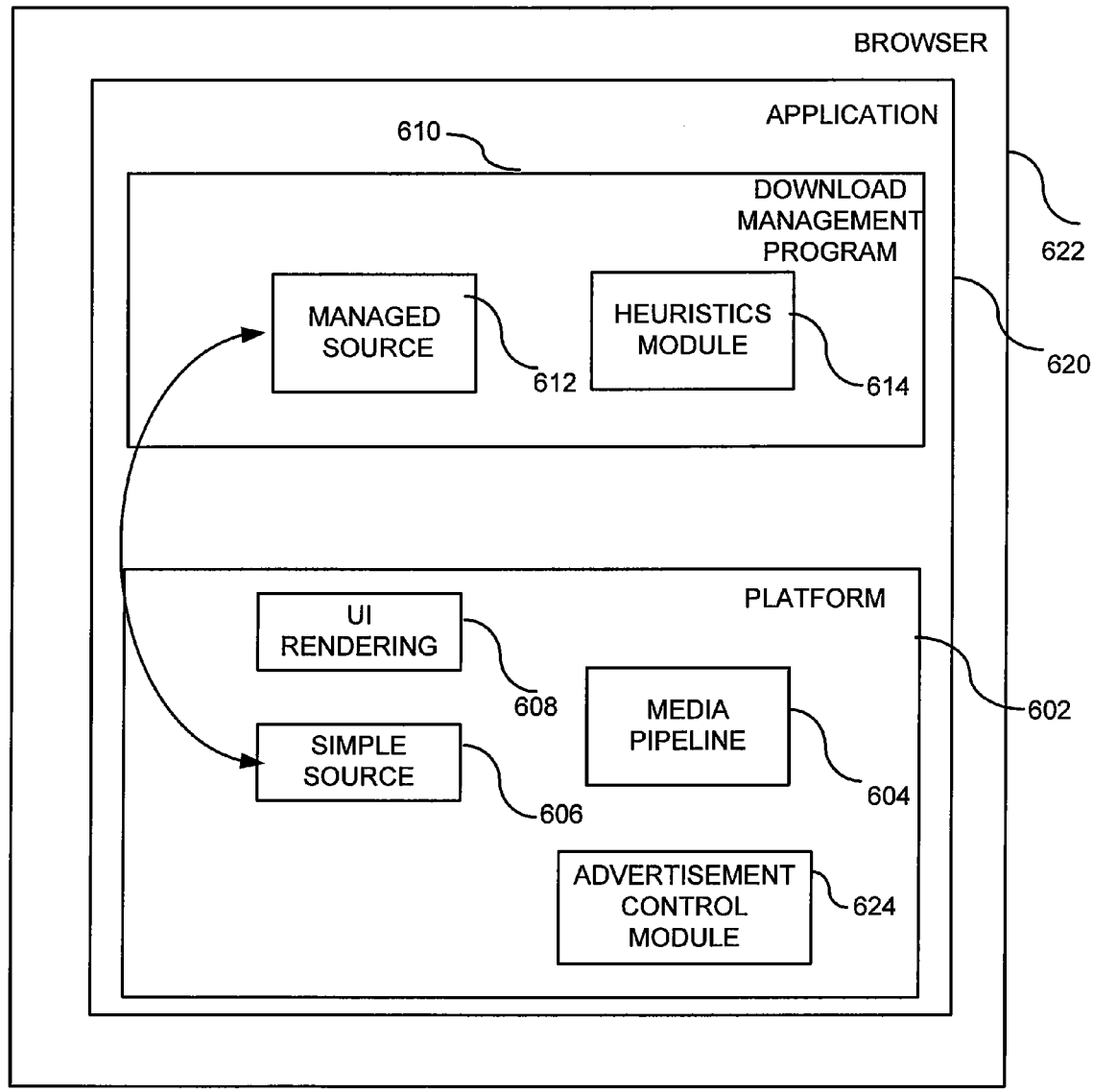
FIG. 6 illustrates an example application for rendering streaming media content on the playback device wherein the media pipeline is in a platform and the heuristics module is in a downloadable (e.g., plug-in) program.

FIG. 6 illustrates another possible environment used to render content on the playback device 104. The lowest layer (not shown) is an operating system executing on the playback device. A platform 602 is an executable file that is downloaded one time from a web server and remains resident on the playback device 104. The platform 602 includes a media pipeline 604 that is explained further below in FIG. 8, a simple source module 606, and a UI rendering module 608 used to render the media stream. A download management program 610 is typically downloaded each time a website is accessed and includes a managed source 612 and a heuristics module 614, which include the intelligence to make decisions about a desired bit rate to download from the host device 102. The purpose of the simple source 606 is to communicate with the managed source 612. Both the managed source 612 and the heuristics module 614 are described further below. The download management program 610 and platform 602 are part of an application 620 that is loaded in a browser 622. An advertisement control module 624 can function similar to the advertisement control module described above in relation to FIG. 5. The advertisement control module can be alternatively positioned within the download management program 620.

Figure 7:
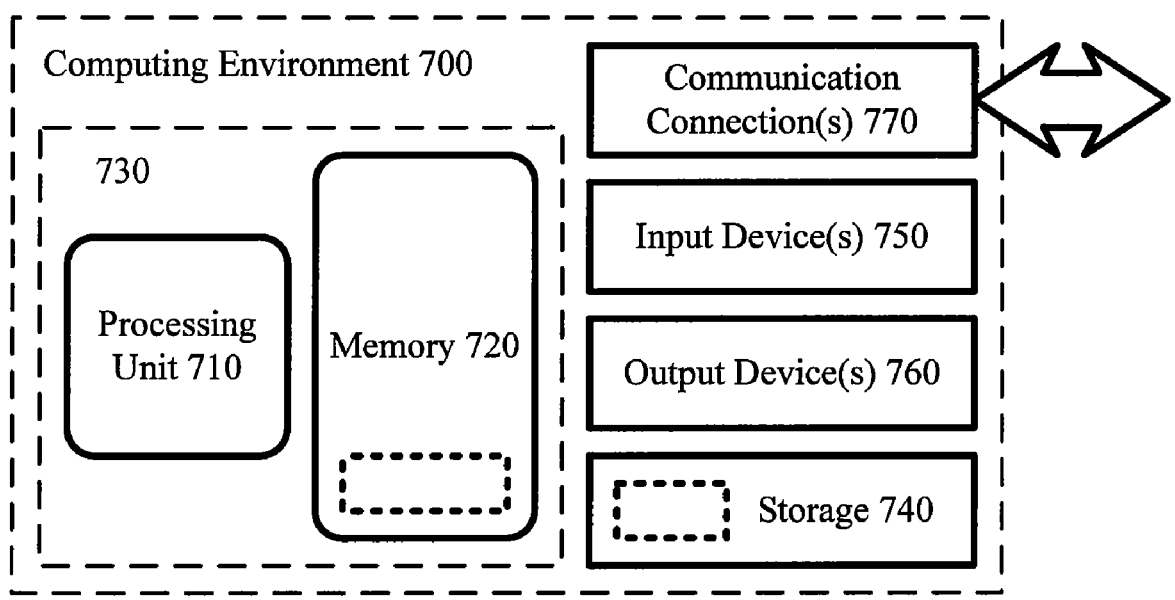
FIG. 7 illustrates an exemplary computing environment.

FIG. 7 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. Similar computing devices may be used as either the host device 102 or the playback device 104. This most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780 implementing the video encoder and/or decoder.

The input device(s) 750 may be a touch input device such as a keyboard, mouse, pen, or trackball, a voice input device, a scanning device, or another device that provides input to the computing environment 700. The input device(s) 750 may be a sound card, video card, TV tuner card, or similar device that accepts audio or video input in analog or digital form, or a CD-ROM or CD-RW that reads audio or video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "produce" and "encode" to describe computer operations in a computing environment. These terms are high-level abstractions for operations performed by a computer, and should not be confused with acts performed by a human being. The actual computer operations corresponding to these terms vary depending on implementation. Generally, the computing environment 700 can be used as the playback device 104.

FIG. 8 shows an example of the media pipeline 804 in more detail. The illustrated media pipeline is only an example of a possible media pipeline that can be used. In this example, a source filter 800 is included in the media pipeline and is coupled to the network to receive audio and video content from the network. The source filter can extract the core media data (by parsing the file, if necessary) and can split the audio and video into two streams. Two decoders 806, 808 can be used to decompress the encoded audio and video, respectively. Two transform modules 810, 812 can transform the decompressed audio and video signals. The transform operations can include a variety of operations, such as changing color space, changing scale, adding special effects, etc. Finally, sinks 814, 816 can be used to transmit the content to the audio and video drivers, respectively.

An index file can be provided by the host and generally describes the different bit rates for the media streams that are available from the network and an address (e.g., URL) where to obtain the source content. In general, the managed source 612 reads data from the network (e.g., Internet), parses the index file that describes the content, parses the file received from the network (e.g., remove header information), communicates with the heuristics module 614 about which bit rate to download next, and maintains an input buffer. The heuristics module 614 instructs the managed source 612 which bit rate to pull next based on empirical data, such as one or more of the following:

1) current and historic bandwidth levels;

2) current and historic buffer levels; and 3) capabilities of the playback device.

An example index file can have separate sections for video and audio and describe the different bit rates that are available to pull from the host. It also can include the URLs, the duration of the content segments, quality information, the size of the files, the number of content segments, position in time of the content segments, the media attributes, etc. In sum, the index file includes information about the time-varying properties of the encoded media streams. An example index file is as follows:

--- manifest

---

```
<MediaIndex MajorVersion="0" MinorVersion="1">
    <Attribute Name="XCP_MS_UINT64_DURATION" Value="30"/>
<StreamIndex
    Type = "video"
    Subtype = "WVC1"
    Chunks = "15"
```

-continued manifest

```
    Url = "{1}/chunk_{1}_{0}.vid"
>
    <Bitrate Kbps = "200"/>
    <Bitrate Kbps = "700"/>
    <Bitrate Kbps = "1500"/>
    <Attribute Name="XCP_MS_UINT32_4CC" value="WVC1"/>
    <Attribute Name="XCP_MS_UINT32_WIDTH" Value="720"/>
    <Attribute Name="XCP_MS_UINT32_HEIGHT" Value="480"/>
    <Attribute Name="XCP_MS_BLOB_VIDEO_CODEC"
Value="270000010FCBEE1670EF8A16783BF180C9089CC4AFA11C0000010E1207F840"/>
        <c n="0" d="20020000"/><c n="1" d="20020000"/><c n="2" d="20020000"/><c
n="3" d="20020000"/><c n="4" d="20020000"/><c n="5" d="20020000"/><c n="6"
d="20020000"/><c n="7" d="20020000"/><c n="8" d="20020000"/><c n="9" d="20020000"/>
        <c n="10" d="20020000"/><c n="11" d="20020000"/><c n="12" d="20020000"/><c
n="13" d="20020000"/><c n="14" d="20020000"/>
</StreamIndex>
<StreamIndex
    Type = "audio"
    Subtype = "WMA"
    Chunks = "15"
    Url = "audio/chunk_{1}_{0}.aud"
    Language="en-us"
>
    <Bitrate Kbps = "700"/>
    <Attribute Name="XCP_MS_BLOB_WAVEFORMATEX"
Value="6101020044AC0000853E00009D0B10000A00008800000F0000000000"/>
        <c n="0" d="20630000"/><c n="1" d="20810000"/><c n="2" d="19390000"/><c
n="3" d="20430000"/><c n="4" d="18800000"/><c n="5" d="20210000"/><c n="6"
d="20440000"/><c n="7" d="19500000"/><c n="8" d="21370000"/><c n="9" d="19040000"/>
        <c n="10" d="19960000"/><c n="11" d="20610000"/><c n="12" d="18870000"/><c
n="13" d="21360000"/><c n="14" d="19510000"/>
</StreamIndex>
</MediaIndex>
```

The content is divided into segments (called chunks) that are generally 2-5 seconds each. The chunks are available at multiple bit rates. As already discussed, the chunks may be physically divided segments or virtually divided segments (in the case of a continuous stream). After a predetermined period of time, the quality and bit rate are reevaluated to ensure a glitch-free display of the media stream.

The designation of "bit rates" refers to the bit rates available for the media stream. The "attribute" names can provide information used by the decoder in the media pipeline in order to decode the media stream. One example is that the attributes can be initialization information for the decoder. There can be different sections in the index file for "video" and "audio", so that the chunks are described independently for each. The designation of "n=" refers to a chunk number. The chunks can be numbered sequentially. The designation of "d=" following each chunk number refers to the duration of the chunk. As can be seen, the chunks are of varying duration but are approximately equal in length. Other characteristics of the media stream can easily be inserted into the index file, such as the size of files associated with the chunks or the duration of the entire media segment. An additional characteristic is also resolution that can be useful to proper rendering. The illustrated index file is only an example and not all of the data elements described need to be used. Indeed, one or more of any of the data elements can be used.

The described index file can be represented as an XML file with the specific schema, potentially, with a simple encoding to hide clear text. It can contain media level attributes (e.g. total playback duration), and description of individual streams. Stream descriptions can include media stream-specific information, such as type of the stream (e.g. video, audio), encoding and other codec information (e.g. fourCC code, width, height), available bitrates, and information on individual media segments represented by chunks of different available bitrates (e.g. segment duration, chunk sizes). Also, the stream description can include information that allows production of individual chunks URLs for download, which is normally a text pattern that includes calculated fields based on chunk number, chunk bitrate, chunk stream and stream type.

Figure 9:
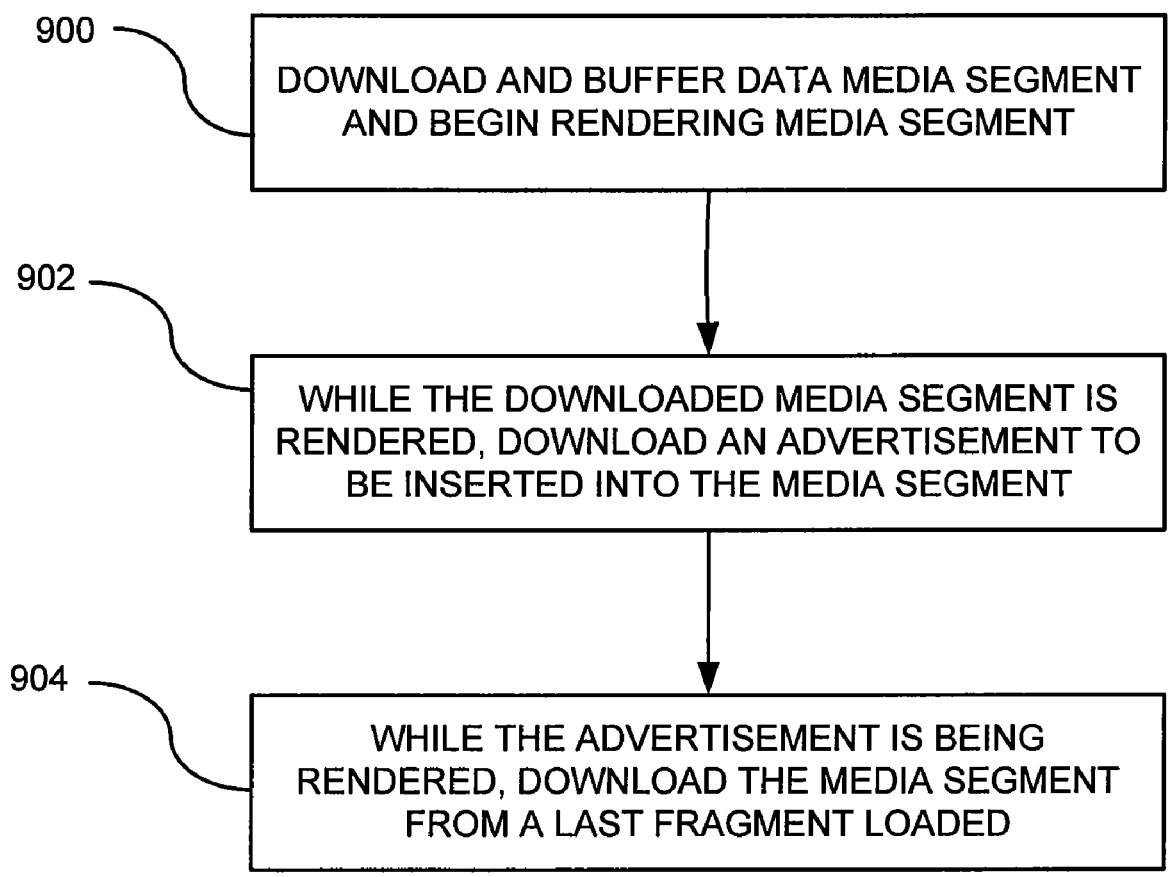
FIG. 9 is a flowchart of one embodiment for seamlessly inserting an advertisement into a media segment.

FIG. 9 is a flowchart of a method for seamlessly rendering advertisements in a media stream. In process block 900, a media stream is downloaded. As described above, the media stream may be downloaded in fragments or chunks. An index file can be used to determine the bit rate and address of the media stream to download. Alternatively, an index file need not be used and the media stream can be continuous. At some point in time, a determination is made that an advertisement is to be rendered. The last fragment of the media stream is downloaded and the bandwidth is released to download an advertisement. As shown at process block 902, the advertisement is downloaded while the media stream is being rendered by the content player. The content player uses the buffered media stream for the rendering. A separate index file can be used to download the advertisement. Once the point of time is reached for rendering the advertisement, the necessary data associated with the advertisement is already buffered and ready to render. Thus, as soon as the last fragment of the media stream is presented, the advertisement can be rendered immediately thereafter to provide a seamless transition. In process block 904, after the advertisement has been downloaded, the content player can resume normal operation of continuing to download the media stream that was being previously presented. As such, the content player begins downloading the media stream from the last point previously buffered, while the advertisement is being rendered. Once the advertisement has completed, the media stream can be seamlessly initiated again to complete the seamless advertisement insertion.

Figure 10:
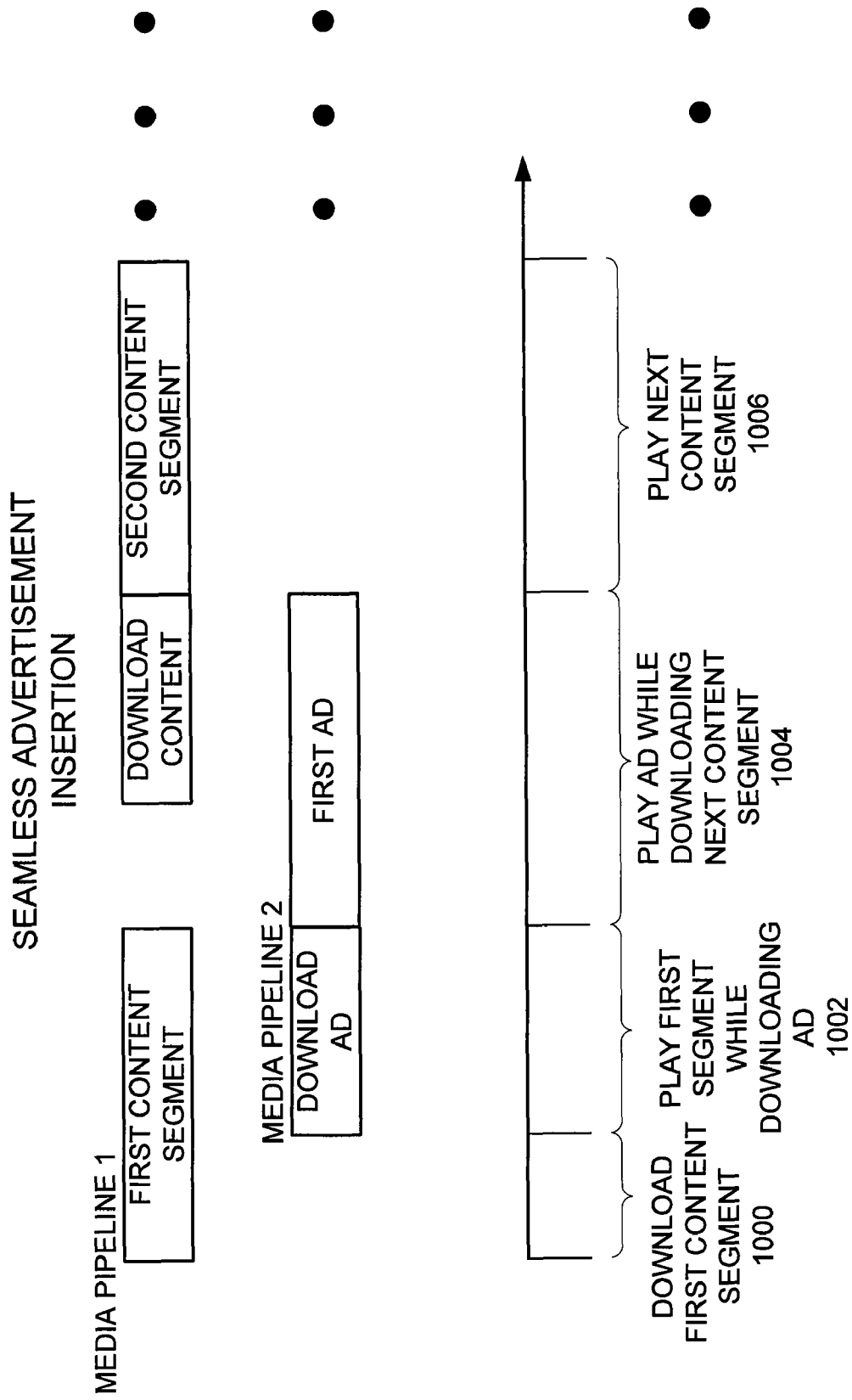
FIG. 10 is a diagram illustrating the seamless advertisement insertion.

FIG. 10 illustrates diagrammatically the seamless advertisement insertion. At 1000, a first content segment can be downloaded using media pipeline 1. At 1002, after the first content segment is downloaded, the first content segment is rendered. Concurrently therewith, an advertisement is downloaded on media pipeline 2. At 1104, while the advertisement is playing, the next content segment is downloaded on media pipeline 1. At 1006, the next content segment is played to complete the seamless insertion of the advertisement.

Figure 11:
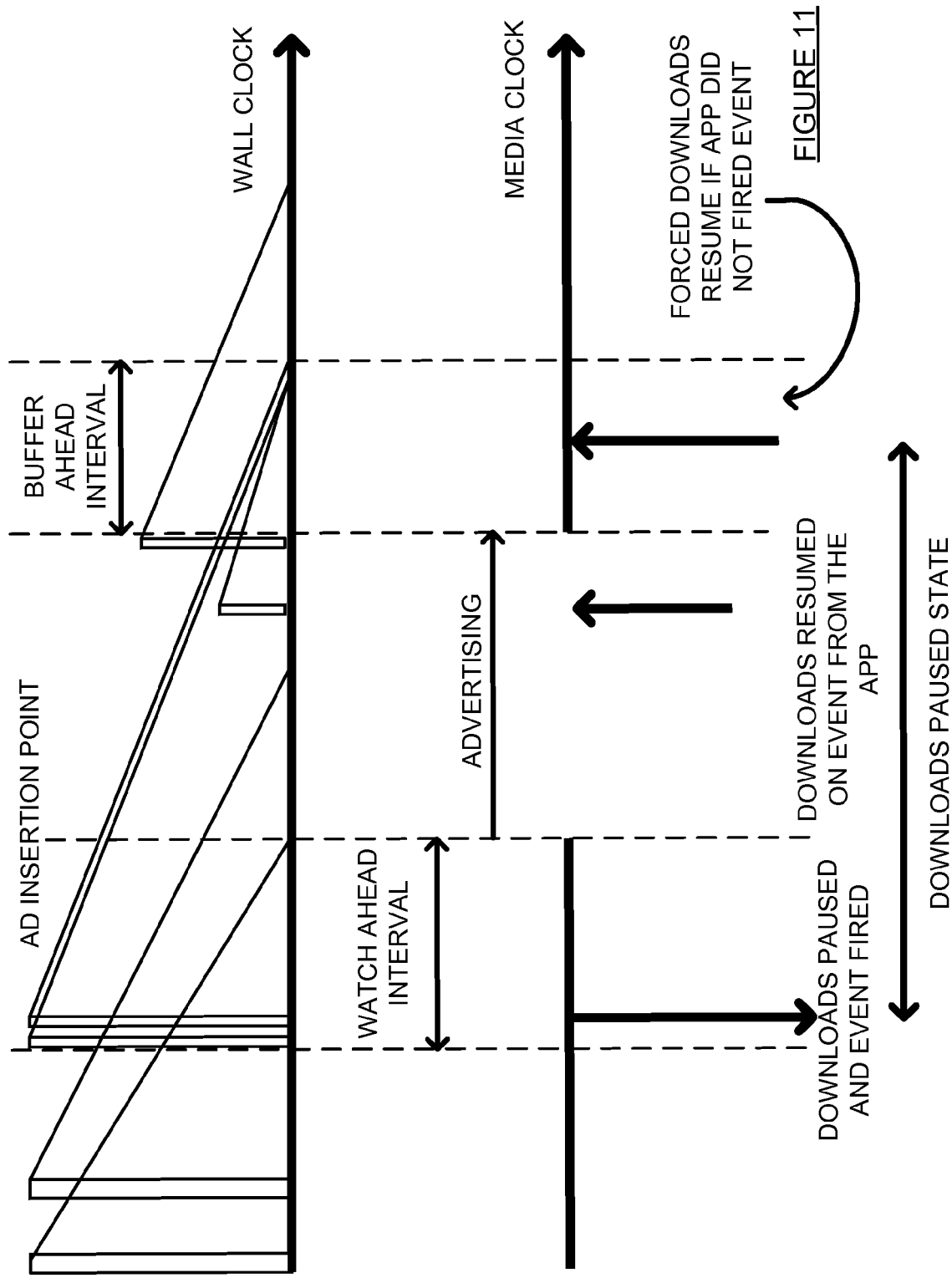
FIG. 11 is a detailed illustration of an embodiment for seamless advertisement insertion.

FIG. 11 illustrates the timing of the seamless insertion. The content player monitors a playback time (media clock) of the content that it is rendering. A trigger is set up relating to an ad insertion point minus a predefined time period called a watch-ahead interval. Once the downloading is pausable, the content player releases control to download advertising. To do this, the content player enters download pause mode where downloads are not initiated anymore. Whether downloading is pausable depends on whether enough content has been buffered until the advertisement is rendered plus some additional content can be saved for startup after the advertisement. If the content startup period is zero, it is more certain that there is time to download the advertisement. If the content startup period is a predetermined time or amount, then a second interval can be used where the content buffered is reduced to the ad insertion point. Once the advertising media is loaded, the content player can initiate further downloads of the media stream. Once past the ad insertion point, the content player cancels download pausing mode to automatically recover even if the application has an error and did not call to resume downloads. In particular embodiments, the media source performs the automatic recovery.

Thus, the application and content player can include resistance to application errors. The content can be freeze-free because of the download pause mode, as it can have a recovery mechanism conditioned on either playing beyond the ad insertion point or requesting media with buffered content going below some predefined threshold.

Figure 12:
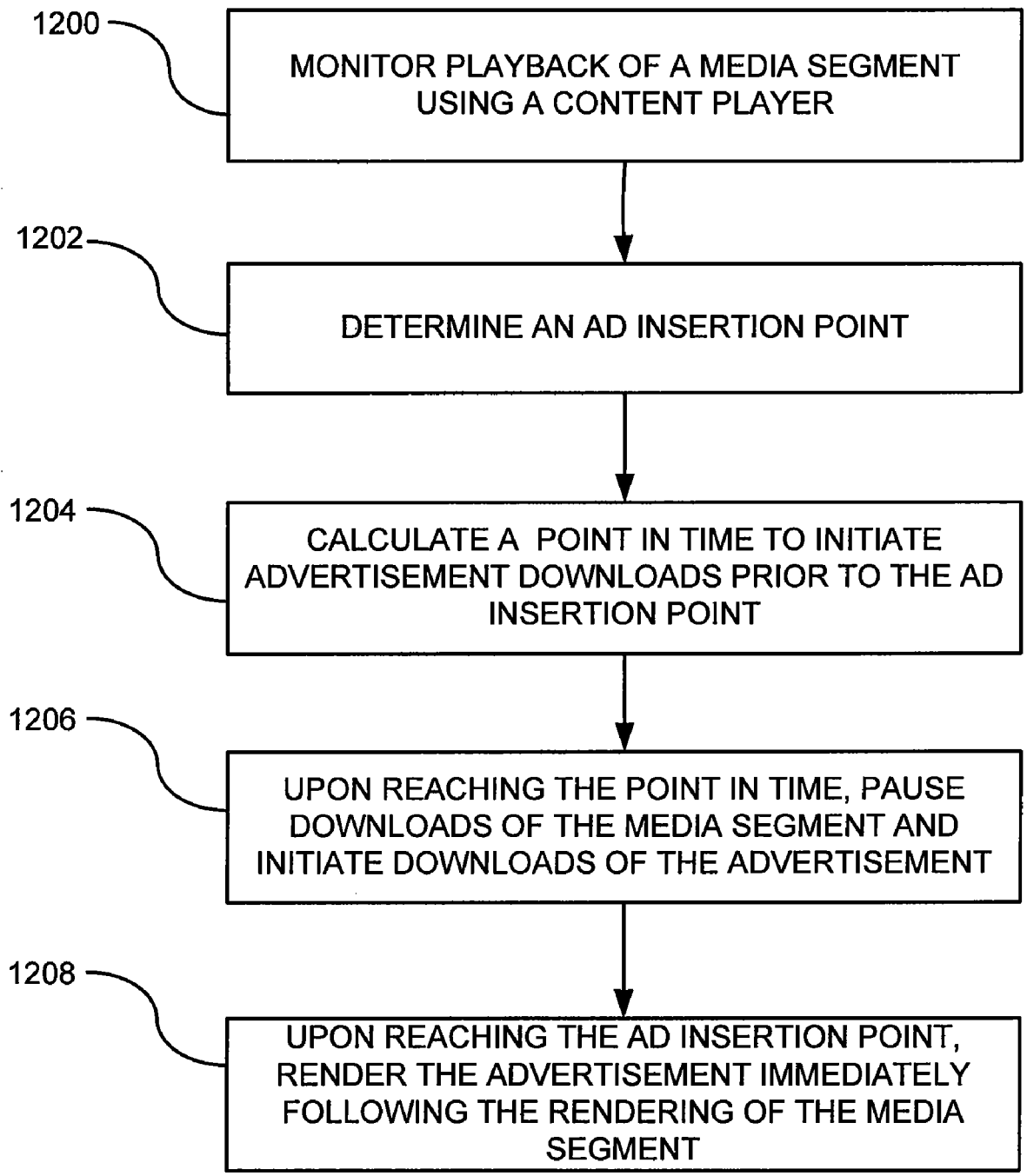
FIG. 12 is a detailed flowchart of another embodiment for seamless advertisement insertion.

FIG. 12 is a flowchart of another embodiment for rendering an advertisement seamlessly. In process block 1200, the content player monitors playback of the media segment that it is rendering. Thus, the content player keeps track of a media clock representing a current location indicator. At process block 1202, an advertisement insertion point is determined. Such a determination can be made through an index file supplied by the server to the player for rendering the media stream. In process block 1204, the content player makes a calculation of a point in time when to initiate advertisement downloads prior to the advertisement insertion point. In process block 1206, upon reaching the point in time, the content player pauses downloads of the media stream and initiates downloads of the advertisements. Nonetheless, while the advertisement is downloading, the content player continues to render content stored in the buffer. In process block 1208, upon reaching the advertisement insertion point, the advertisement is immediately rendered because it was previously buffered.

Figure 13:
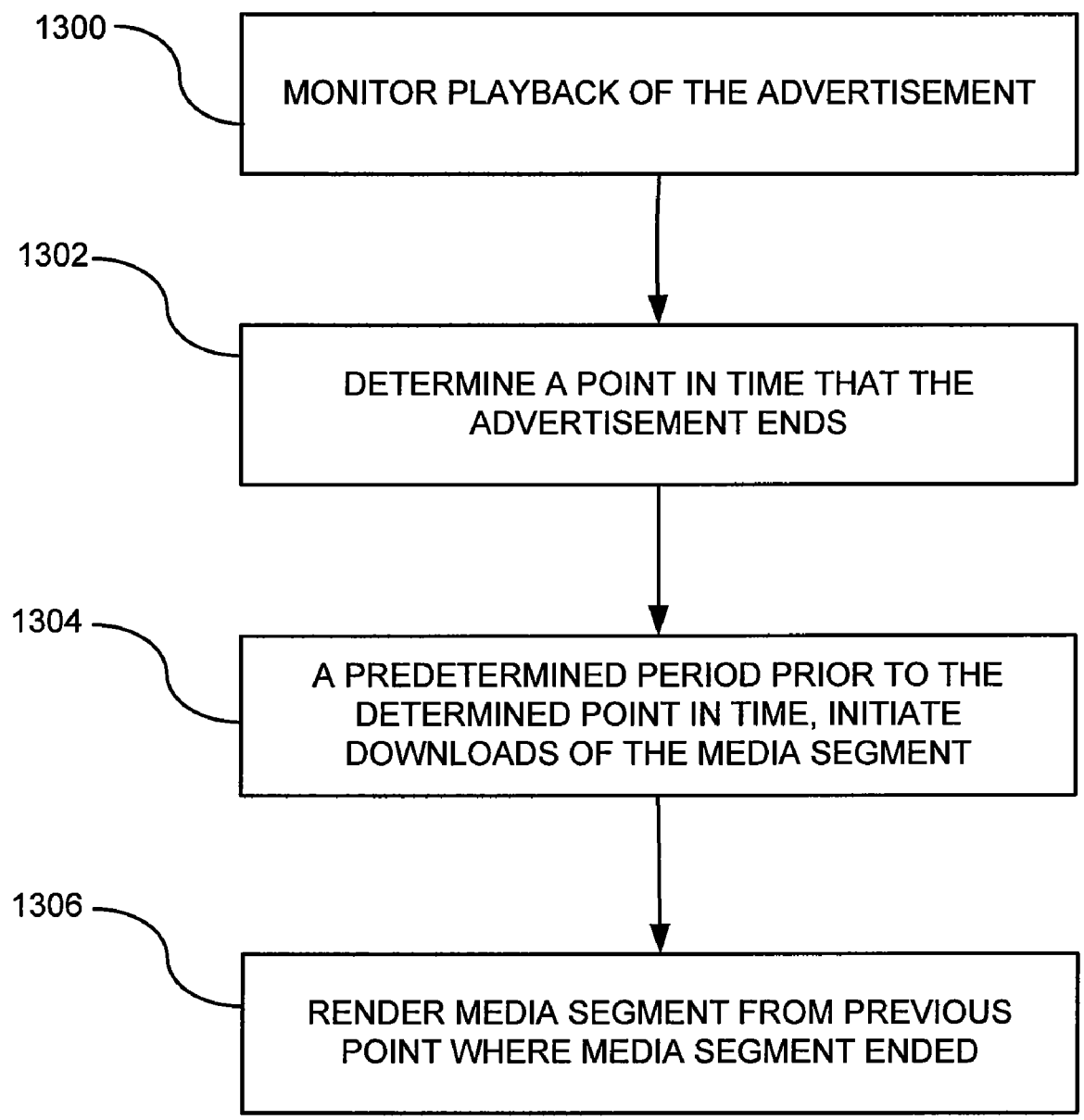
FIG. 13 is a detailed flowchart of another embodiment for seamlessly rendering the media segment at the end of the advertisement.

FIG. 13 is a flowchart of a method for seamlessly concluding the advertisement and re-starting the media stream that was previously being rendered prior to the commercial. In process block 1300, the player monitors the playback of the advertisement. In process block 1302, a determination is made about the point in time that the advertisement ends. In process block 1304, a predetermined period prior to the determined point in the media stream, downloads of the media segment are re-commenced. In process block 1306, as soon as the advertisement ends, the media segment is rendered starting from where it left off previously.

FIG. 14 shows another embodiment with the interaction between a browser, an application, a player, etc. As can be seen, the application is executed within the browser. The player is a part of the screen in the application devoted to showing video. In this embodiment, the following events can occur:

1. The player tells the mediasource the ad insertion point.
2. The mediaelement/source renders the content.
3. At some point in time, after the watch interval is passed, the mediasource stops loading content and calls downloadspaused event to the player. However, the mediasource continues to play.
4. The player downloads the advertisement media.
5. The player, at the ad insertion point, pauses the content media source and starts playing the advertisement.
6. Once the advertisement is loaded, the player calls downloadsresume on the mediasource. This may occur before or after point 5.
7. In response, mediasource starts loading the content media.
8. Once the advertisement is played, the player resumes mediaelement/mediasource and it continues to play the main content.

It will be recognized that the media source can be considered part of the player. Additionally, the player can be considered part of the application. In other embodiments, the application may be unaware of the advertisement insertion points, although it can provide the player with the location where to load advertisements.

It will be further recognized by those skilled in the art that the index files described herein are not needed for implementing any of the methods described herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method for advertisement insertion on a playback device, comprising:
    downloading a media segment on the playback device from a server computer over a network by decoding the media segment in a first media pipeline;
    while the media segment is being rendered on the playback device, downloading at least a portion of an advertisement to be rendered;
    seamlessly switching between rendering the media segment and rendering the advertisement; and
    determining an advertisement insertion point at which the advertisement is to be rendered and calculating a point in time prior to the advertisement insertion point to initiate downloading the advertisement and decoding at least a portion of the advertisement in a second media pipeline.

2. The method of claim 1, further including storing a point in time associated with a last fragment of the media segment that was buffered and reinitiating downloading a next fragment in the media segment while the advertisement is being rendered.

3. The method of claim 1, further including separately choosing a bit rate associated with the media segment and a bit rate associated with the advertisement.

4. The method of claim 1, wherein the network is the Internet.

5. The method of claim 1, wherein the advertisement is downloaded without rendering until after the first segment has been rendered.

6. The method of claim 1, wherein the media stream is available at multiple bit rates from a server computer coupled to the playback device.

7. The method of claim 1, further including using a content index file associated with the media stream for describing characteristics of the media stream and using an advertisement index file that describes characteristics of the advertisement, including at least an insertion point for the advertisement.

8. A method for advertisement insertion on a playback device, comprising:
  downloading at least one segment of a media stream using a first media pipeline;
  while the at least one segment is being rendered, determining an advertisement insertion point at which the advertisement is to be rendered and downloading the advertisement using a second media pipeline; and
  rendering the advertisement using a seamless transition after the first segment has been rendered.

9. The method of claim 8, further including downloading a second segment of the media stream using the first media pipeline while the advertisement is being rendered and rendering the second segment after the advertisement has been rendered.

10. The method of claim 8, wherein the advertisement is downloaded without rendering until after the first segment has been rendered.

11. The method of claim 8, wherein the media stream is available at multiple bit rates from a server computer coupled to the playback device.

12. The method of claim 8, wherein the playback device includes one of the following: a computer, a mobile phone, a gaming console, and a television; and wherein the network is the Internet.

13. The method of claim 8, further including using an advertisement control module that switches the rendering between the first and second media pipelines.

14. A method for displaying content on a playback device coupled to a network, comprising:
  receiving a media stream to display from the network in a first media pipeline, wherein the media stream comprises at least multiple sequential media fragments encoded at a first bit rate;
  calculating a point in time prior to initiate downloading an advertisement;
  while rendering the media stream, initiate downloading of the advertisement in accordance with the calculation at a second bit rate in a second media pipeline; and
  rendering the advertisement at a predetermined point in the media stream after one of the media fragments has been rendered.

15. The method of claim 14, wherein the first bit rate and the second bit rate are equal.

16. The method of claim 14, further including receiving additional media fragments of the media stream while the advertisement is being rendered and rendering the additional media fragments seamlessly once the advertisement is complete.

\* \* \* \* \*